(12) United States Patent
Alam et al.

(10) Patent No.: US 11,455,469 B2
(45) Date of Patent: *Sep. 27, 2022

(54) PERSONALITY BASED SENTIMENT ANALYSIS OF TEXTUAL INFORMATION WRITTEN IN NATURAL LANGUAGE

(71) Applicant: International Business Machines Corporation, Armonk, NY (US)

(72) Inventors: Nebula Alam, Melbourne (AU); Rajib Chakravorty, Melbourne (AU); Lida Ghahremanlou, Southbank (AU); Jorge Andres Moros Ortiz, Melbourne (AU); Dheerender Velu Palani, Berwick (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/686,667

(22) Filed: Nov. 18, 2019

(65) Prior Publication Data

US 2020/0081983 A1 Mar. 12, 2020

Related U.S. Application Data

(63) Continuation of application No. 15/068,753, filed on Mar. 14, 2016, now Pat. No. 10,489,509.

(51) Int. Cl.
*G06F 17/00* (2019.01)
*G06F 40/30* (2020.01)
(Continued)

(52) U.S. Cl.
CPC .......... *G06F 40/30* (2020.01); *G06F 3/04817* (2013.01); *G06Q 10/00* (2013.01); *G06Q 10/107* (2013.01); *G06F 2203/011* (2013.01)

(58) Field of Classification Search
CPC .. G06F 16/9535; G06F 40/30; G06F 16/3344; G06F 40/279; G06F 40/40;
(Continued)

(56) References Cited

U.S. PATENT DOCUMENTS 7,360,151 B1 * 4/2008 Froloff .................. G06F 40/186
715/255
7,813,986 B2 10/2010 Gardner et al.
(Continued)

FOREIGN PATENT DOCUMENTS

CA 2767691 A1 8/2012
WO 2013012211 A2 1/2013

OTHER PUBLICATIONS

Chenlo J.M., Hogenboom A., Losada D.E. (2013) Sentiment-Based Ranking of Blog Posts Using Rhetorical Structure Theory. In: Métais E., Meziane F., Saraee M., Sugumaran V., Vadera S. (eds) Natural Language Processing and Information Systems. Lecture Notes in Computer Science, vol. 7934. (Year: 2013).*

(Continued)

*Primary Examiner* — Michael Ortiz-Sanchez
(74) *Attorney, Agent, or Firm* — Joseph Petrokaitis; Otterstedt & Kammer PLLC

(57) ABSTRACT

A sentiment analyzer obtains natural language media input and determines sentiment of the natural language media input. A personality analyzer obtains data indicative of a personality of an originator of the natural language media input and determines a personality metric of the originator of the natural language media input. The sentiment of the natural language media input and the personality metric of the originator of the natural language media input are combined to obtain a personality-based sentiment of the natural language media input. The natural language media input is provided to a receiver together with a representation (Continued)

of the personality-based sentiment of the natural language media input.

15 Claims, 13 Drawing Sheets

(51) Int. Cl.
*G06F 3/04817* (2022.01)
*G06Q 10/10* (2012.01)
*G06Q 10/00* (2012.01)

(58) Field of Classification Search
CPC .... G06F 16/24578; G06F 40/10; G06F 16/30; G06F 16/337; G06F 40/284; G06F 16/90324; G06F 40/20; G06F 11/3409; G06F 16/367; G06F 16/583; G06F 16/958; G06F 40/169; G06F 40/295; G06F 16/248; G06F 16/313; G06F 16/435; G06F 16/48; G06F 16/24575; G06F 40/289; G06F 3/04817; G06F 2203/011; G06F 16/90332; G06F 16/35; G06F 3/048; G06F 2203/00; G06Q 50/01; G06Q 30/0201; G06Q 30/00; G06Q 30/0269; G06Q 10/0635; G06Q 30/02; G06Q 30/0251; G06Q 10/00; G06Q 10/107; G06N 20/00; G06N 5/022; G10L 25/63; G10L 15/1815; Y10S 707/917; Y10S 707/99937; H04L 51/32; H04L 67/306

See application file for complete search history.

(56) References Cited

U.S. PATENT DOCUMENTS

| | | | |
|---|---|---|---|
| 8,463,595 | B1 | 6/2013 | Rehling et al. |
| 9,336,192 | B1 | 5/2016 | Barba et al. |
| 9,575,959 | B2 | 2/2017 | Takeuchi et al. |
| 9,606,711 | B2 | 3/2017 | Albouyeh et al. |
| 10,050,926 | B2 * | 8/2018 | Ebersman ........... G06F 3/04817 |
| 10,489,509 | B2 | 11/2019 | Alam et al. |
| 2006/0069589 | A1 | 3/2006 | Nigam et al. |
| 2007/0271098 | A1 | 11/2007 | Stewart et al. |
| 2009/0271244 | A1 | 10/2009 | Kalasapur et al. |
| 2010/0114930 | A1 | 5/2010 | Kalasapur et al. |
| 2012/0197950 | A1 | 8/2012 | Dayal et al. |
| 2012/0278064 | A1 * | 11/2012 | Leary .................. G06F 40/253 704/9 |
| 2013/0138746 | A1 | 5/2013 | Tardelli et al. |
| 2013/0152000 | A1 | 6/2013 | Liu et al. |
| 2013/0346067 | A1 | 12/2013 | Bhatt |
| 2014/0188459 | A1 | 7/2014 | Fink et al. |
| 2014/0357365 | A1 | 12/2014 | Kruglick |
| 2015/0195406 | A1 * | 7/2015 | Dwyer .................. G10L 15/26 379/265.07 |
| 2016/0098480 | A1 | 4/2016 | Nowson |
| 2016/0163332 | A1 | 6/2016 | Un et al. |
| 2016/0196334 | A1 | 7/2016 | Bastide et al. |
| 2016/0232137 | A1 | 8/2016 | Liu |
| 2016/0232201 | A1 | 8/2016 | Goran et al. |
| 2016/0232244 | A1 | 8/2016 | Liu et al. |
| 2017/0017998 | A1 | 1/2017 | Dhawan et al. |
| 2017/0083599 | A1 | 3/2017 | Bostick et al. |
| 2017/0147202 | A1 | 5/2017 | Donohue |
| 2017/0206557 | A1 | 7/2017 | Abrol et al. |

OTHER PUBLICATIONS

About AlchemyData News. Downloaded from http://docs.alchemyapi.com/?cm_mc_uid=03737632655014066131806&cm_mc_sid_50200000=1444002260 on Feb. 27, 2016. pp. 1-3.

AlchemyLanguage. Downloaded from http://www.ibm.com/smarterplanet/us/en/ibmwatson/developercloud/al on Mar. 10, 2016. pp. 1-4.

Peter Mell et al. The NIST Definition of Cloud Computing. NIST Special Publication 800-145. Sep. 2011. pp. 1-7.

Julian B. Rotter. Generalized Expectancies for Internal Versus External Control of Reinforcement. Psychologial Monographs: General and Applied. vol. 80, No. 1. Whole No. 609, 1966. pp. 1-28.

Jacob B. Hirsh et al. Personality and language use in self-narratives. Journal of Research in Personality 43 (2009) pp. 524-527.

Francois Mairesse et al. Using Linguistic Cues for the Automatic Recognition of Personality in Conversation and Text. Journal of Artificial Intelligence Research 30 (2007). pp. 457-500.

Tal Yarkoni. Personality in 100,000 Words: A large-scale analysis of personality and word use among bloggers NIH Public Access Author Manuscript, Jun. 2010. pp. 1-23.

Personality Insights | IBM Watson Developer Cloud. Downloaded from http://www.ibm.com/smarterplanet/us/en/ibmwatson/developercloud/personality%ADinsights.html on Feb. 27, 2016. pp. 1-5.

Sentiment Analysis API. Downloaded from http://www.alchemyapi.eom/api/sentiment%ADanalysis1/3 on Feb. 27, 2016. pp. 1-3.

Tera Marie Green & Brian Fisher. Towards the Personal Equation of Interaction: The impact of personality factors on visual analytics interface interaction. IEEE Symposium on Visual Analytics Science and Technology Oct. 24-28, Nov. 2010. pp. 203-210.

Caroline Ziemkiewicz et al. How Visualization Layout Relates to Locus of Control and Other Personality Factors. IEEE Transactions on Visualization & Computer Graphics, Issue No. 07—Jul. 2013 vol.19 pp. 1109-1121 (reprint 1-14).

Zhang, Lei, et al. "Combining Lexicon-based and Learning-based Methods for Twitter Sentiment Analysis." (2011 ).

Tan, Chenhao, et al. "User-level sentiment analysis incorporating social networks." Proceedings of the 17th ACM SIGKDD international conference on Knowledge discovery and data mining. ACM, 2011.

Paul J. Otterstedt, List of IBM Patents or Patent Applications Treated as Related, Dec. 13, 2019, pp. 1-2.

* cited by examiner

| Personality Trait | Facet (Variable) |
|---|---|
| Big5: Agreeableness | Altruism, Cooperation, Trust |
| Big5: Conscientiousness | Dutifulness |
| Big5: Extraversion | Cheerful, Friendliness, Gregariousness |
| Big5: Neuroticism | Anger, Anxiety, Self-consciousness, Immoderation, Vulnerability |
| Need | Harmony, Ideal, Structure, Love, Practicality |
| Values | Self-transcendence, Conservation |

FIG.6

| Final PBS Score | Emoticon |
|---|---|
| Very Tense | 😟 |
| More Tense | 😕 |
| Tense | 😌 |
| Neutral | 😐 |
| Happy | 🙂 |
| Very Happy | 😄 |

FIG.7

| Trait | Definition | Facets |
|---|---|---|
| Big5 | Openness-to-experience: the extent to which a person is open to experience a variety of activities<br>Conscientiousness: a tendency that a person acts in an organized or spontaneous way<br>Extraversion: a tendency to seek stimulation in the company of others<br>Agreeableness: a tendency to be compassionate and cooperative towards others<br>Neuroticism: the extent to which a person's emotion is sensitive to the environment | Altruism<br>Cooperation<br>Trust<br>Dutifulness<br>Cheerful<br>Friendliness<br>Gregariousness<br>Anger<br>Anxiety<br>Self-consciousness<br>Immoderation<br>Vulnerability |
| Basic Values | Self-transcendence: showing concern for the welfare and interests of others<br>Conservation: emphasizing conformity, tradition, security<br>Self-enhancement: seeking personal success for oneself<br>Openness-to-change: emphasizing stimulation, self-direction<br>Hedonism: seeking pleasure and sensuous gratification for oneself | Self transcendence<br>Conservation |
| Needs | Ideals: a desire for perfection<br>Harmony: appreciating other people, their feelings<br>Closeness: being connected to family and setting up home<br>Self-expression: discovering and asserting one's own identity<br>Excitement: upbeat emotions, and having fun<br>Curiosity: a desire to discover and grow | Harmony<br>Ideal<br>Structure<br>Love<br>Practicality |

FIG.10

| Facet (Variable) | High Score | Low Score |
|---|---|---|
| Altruism | Find that helping others is genuinely rewarding, that doing things for others is a form of selffulfilment rather than self-sacrifice. | You are more concerned with taking care of yourself than taking time for others. |
| Cooperation | Dislike confrontation. They are perfectly willing to compromise or to deny their own needs to get along with others. | You do not shy away from contradicting others. |
| Trust | Assume that most people are fundamentally fair, honest, and have good intentions. They take people at face value and are willing to forgive and forget. | You are wary of other people's intentions and do not trust easily. |
| Dutifulness | Have a strong sense of duty and obligation. | You take rules and obligations seriously, even when they are inconvenient. |
| Cheerful | Experience a range of positive feelings, including happiness, enthusiasm, optimism, and joy. | You frequently doubt your ability to achieve your goals. |
| Friendliness | Genuinely like other people and openly demonstrate positive feelings toward others. | You are a private person and do not let many people in. |
| Gregariousness | Find the company of others pleasantly stimulating and rewarding. They enjoy the excitement of crowds. | You have a strong desire to have time to yourself. |

FIG.11A

| Facet (Variable) | High Score | Low Score |
|---|---|---|
| Anger | Have a tendency to feel angry. | It takes a lot to get you angry. |
| Anxiety | Often feel like something unpleasant, threatening, or dangerous is about to happen. The "fight-or-flight" system of their brains is too easily and too often engaged. | You tend to feel calm and self-assured. |
| Self-consciousness | Are sensitive about what others think of them. Their concerns about rejection and ridicule cause them to feel shy and uncomfortable around others; they are easily embarrassed. | You are hard to embarrass and are self-confident most of the time. |
| Immoderation | Feel strong cravings and urges that they have difficulty resisting, even though they know that they are likely to regret them later. They tend to be oriented toward short-term pleasures and rewards rather than long-term consequences. | You have control over your desires, which are not particularly intense. |
| Vulnerability | Have difficulty coping with stress. They experience panic, confusion, and helplessness when under pressure or when facing emergency situations. | You handle unexpected events calmly and effectively. |

FIG.11B

| Facet (Variable) | High Score | Low Score |
|---|---|---|
| Harmony | Appreciate other people, their viewpoints, and their feelings | Difficulty in accepting other people |
| Ideal | Desire perfection and a sense of community. | Sense of not belonging |
| Structure | Exhibit groundedness and a desire to hold things together. They need things to be well organized and under control. | Un-organized and lack of discipline |
| Love | Enjoy social contact, whether one-to-one or one-to-many. Any brand that is involved in bringing people together taps this need. | Afraid of commitment, Lack of empathy |
| Practicality | Have a desire to get the job done, a desire for skill and efficiency, which can include physical expression and experience. | Not to be able to focus |
| Self-transcendence | Show concern for the welfare and interests of others | Selfish in nature |
| Conservation | Emphasize self-restriction, order, and resistance to change. | Welcoming to new opportunities and changes |

FIG. 11C

PERSONALITY BASED SENTIMENT ANALYSIS OF TEXTUAL INFORMATION WRITTEN IN NATURAL LANGUAGE

CROSS-REFERENCE TO RELATED APPLICATIONS

This application is a continuation of U.S. patent application Ser. No. 15/068,753 filed Mar. 14, 2016, the complete disclosure of which is expressly incorporated herein by reference in its entirety for all purposes.

STATEMENT OF GOVERNMENT RIGHTS

Not Applicable.

FIELD OF THE INVENTION

The present invention relates to the electrical, electronic and computer arts, and, more particularly, to natural language computing systems and the like.

BACKGROUND OF THE INVENTION

In today's world there is an explosion of information; much of this information is produced as a result of human entered data in natural language. On the internet, the information generated may be as result of social media activity; in the form of user reviews on products and/or businesses; and/or as blogs or the like. In an office set-up, large amounts of similar information are created to communicate between office workers, primarily using email and chat systems.

SUMMARY OF THE INVENTION

Principles of the invention provide techniques for personality based sentiment analysis of textual information written in natural language. In one aspect, an exemplary method includes obtaining, at a sentiment analyzer, natural language media input; determining, with the sentiment analyzer, sentiment of the natural language media input; obtaining, at a personality analyzer, data indicative of a personality of an originator of the natural language media input; determining, with the personality analyzer, a personality metric of the originator of the natural language media input; combining the sentiment of the natural language media input and the personality metric of the originator of the natural language media input, to obtain a personality-based sentiment of the natural language media input; and providing the natural language media input to a receiver together with a representation of the personality-based sentiment of the natural language media input.

In another aspect, an exemplary apparatus includes a memory; at least one processor, coupled to the memory; and a non-transitory computer readable medium including computer executable instructions which when loaded into the memory configure the at least one processor to form a sentiment analyzer; form a personality analyzer; obtain, at the sentiment analyzer, natural language media input; determine, with the sentiment analyzer, sentiment of the natural language media input; obtain, at the personality analyzer, data indicative of a personality of an originator of the natural language media input; determine, with the personality analyzer, a personality metric of the originator of the natural language media input; combine the sentiment of the natural language media input and the personality metric of the originator of the natural language media input, to obtain a personality-based sentiment of the natural language media input; and provide the natural language media input to a receiver together with a representation of the personality-based sentiment of the natural language media input.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects; for example, one or more embodiments provide any one, some, or all of the following benefits:

Enhanced accuracy in identifying sender emotion;
Sentiment ranking as part of the email preview, in the form of an emoticon;
Filtering/Sorting of emails based on Sentiment (PBSA);
Playing an emotion sound;
Playing sentiment sound forecast (the system plays last X number of unopened emails—received in the afternoon—as a result providing the user with a sentiment forecast for what is ahead, and as a way to inform priorities; i.e., angry sound, or congratulations sound.)

These and other features and advantages of the present invention will become apparent from the following detailed description of illustrative embodiments thereof, which is to be read in connection with the accompanying drawings.

BRIEF DESCRIPTION OF THE DRAWINGS

FIG. 6 presents a table of personality traits, according to an aspect of the invention;

FIG. 7 presents an exemplary mapping of Personality Based Sentiment score (PBSS) to emoticons, according to an aspect of the invention;

FIGS. 10 and 11A-11C present a more detailed table of personality traits, according to an aspect of the invention.

DETAILED DESCRIPTION OF PREFERRED EMBODIMENTS

Figure 1:
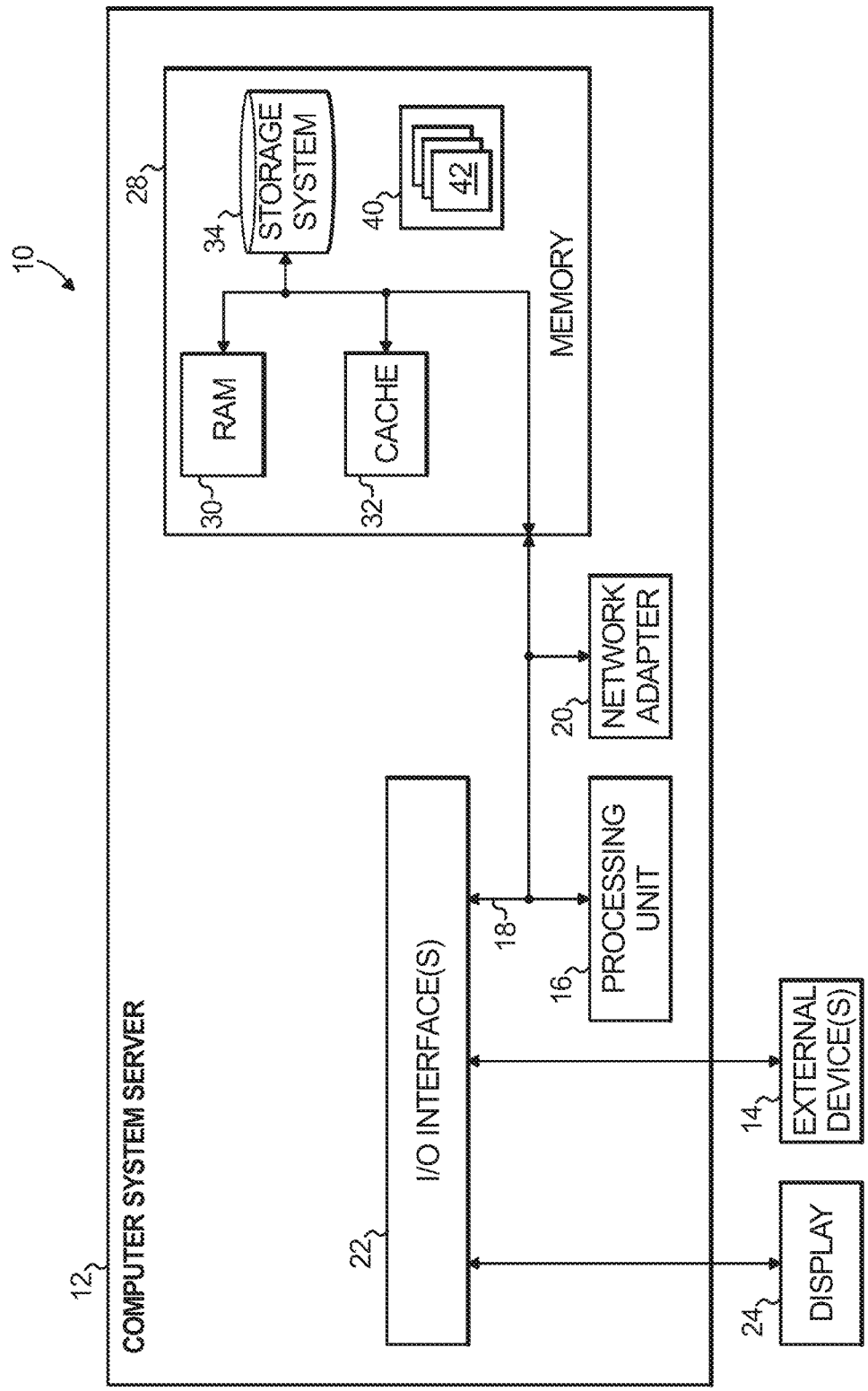
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Figure 2:
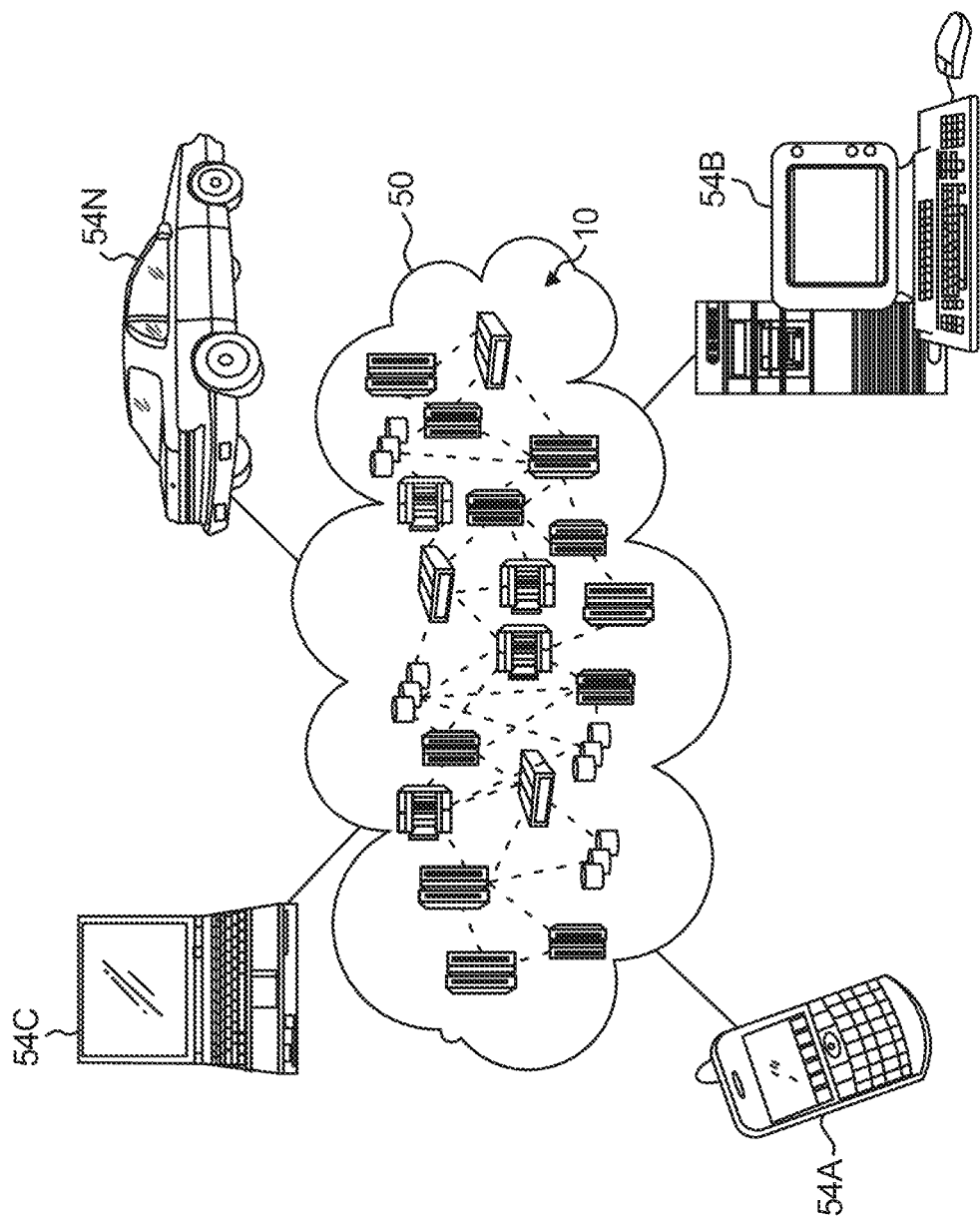
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
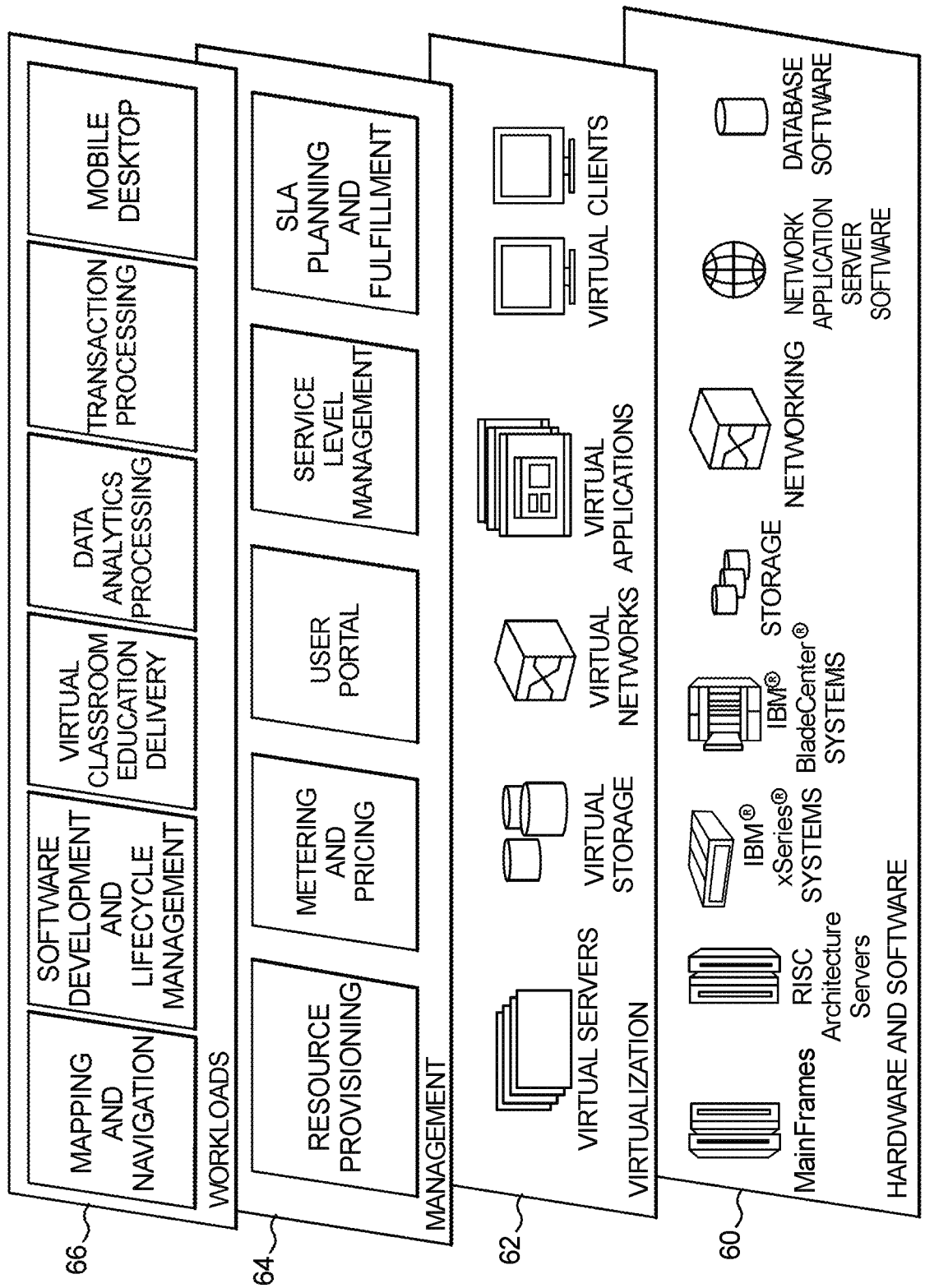
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM Web Sphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted, in today's world there is an explosion of information; much of this information is produced as a result of human entered data in natural language. On the internet, the information generated may be as result of social media activity; in the form of user reviews on products and/or businesses; and/or as blogs or the like. In an office set-up, large amounts of similar information are created to communicate between office workers, primarily using email and chat systems.

Often, the emotions in the information produced in this way can be ambiguous and not always comprehendible. The personality of a person and the choice of words used to construct sentences and paragraphs can have a big effect on how the information is captured and how it can be understood by the reader. The reader could misunderstand or misinterpret what is being communicated or sometimes even find it hard to fully comprehend. The skilled artisan will thus appreciate that one or more embodiments are directed to issues which are necessarily rooted in computer technology in order to overcome a problem specifically arising in the realm of computer networks.

One or more embodiments advantageously address these problem(s)/issue(s) by performing sentiment analysis on the written text and co-relating that with the personality of the information creator (writer), thereby resulting in a Personality Based Sentiment (PBS) Analysis of data.

The techniques disclosed herein can be used in any scenario where the information is in an unstructured natural language format and is produced by a human; purely by way of example and not limitation, an exemplary embodiment is set forth in the context of a typical office email system.

Email systems are the most widely used communication mechanism today in both professional and personal situations. They have been around for over two decades, but not much has changed in the way they work and the information they provide to the user. One or more embodiments can be used to address two problem areas associated with current email systems:

Ambiguity or vagueness in the information carried by the email: There are times when the information that is sent in the email is ambiguous due to the choice of words used by the sender, and may also be influenced by the sender's personality. One or more embodiments alleviate this problem by extracting personality-based sentiments from the email and its sender and presenting same to the email receiver.

Prioritizing emails based on sentiment level: In current email systems, the receiver is not able prioritize the emails based on the sentiment or emotion level contained in the email, without having to read the entire email body (and even then, the perception varies due to the difference of personality between the sender and the receiver). One or more embodiments alleviate this problem by presenting the personality based sentiment (PBS) score against each email as a preview in the inbox. The user can prioritize for example, 'unhappy' emails from customers over 'happy' emails.

It is worth noting that one or more embodiments take the user personality into account (sentiment in relation to the sender's personality). One or more embodiments analyze textual data to determine the sentiment. One or more embodiments provide email sentiment ranking, considering the personality of the user in relation to the email content—this correlation provides the opportunity to offer a more accurate sentiment than prior art techniques. At least some embodiments assign sound, filter by sentiment, and/or play a sentiment sound forecast.

In one or more embodiments, an email analyzer uses the sender's email ID to identify the person and then carries out personality analysis based on the person's social media activity. Examples of social media include public platforms like Twitter and/or Facebook as well as internal enterprise social media or collaborating platforms.

Next, the email analyzer extracts the textual information from the email body and runs a sentiment analysis on that extracted text. In some instances, the results from personality analysis and sentiment analysis are input into a custom algorithm that correlates the two results and generates a final Personality based Sentiment score (PBS Score). The final score is rendered using simple emoticons (e.g. so-called "smileys") based on the overall sentiment or tone.

In one or more embodiments, the emoticon is pinned to the email and presented in the inbox view. Each emotion is also complemented with a human like sound that represents the emotion and can be played to "listen to the emotion." For example, a laughing sound represents a very happy and positive PBS score.

One or more non-limiting exemplary embodiments make use of cognitive services provided by IBM Watson Services. Given the teachings herein, the skilled artisan will be able to select a suitable IBM Watson API such as AlchemyLanguage, Concept Expansion, Concept Insights, Dialog, Document Conversion, Language Translation, Natural Language Classifier, Personality Insights, Relationship Extraction, Retrieve and Rank, and/or Tone Analyzer, available from International Business Machines Corporation, Armonk, N.Y., USA, or other suitable API, to implement one or more embodiments.

Figure 4:
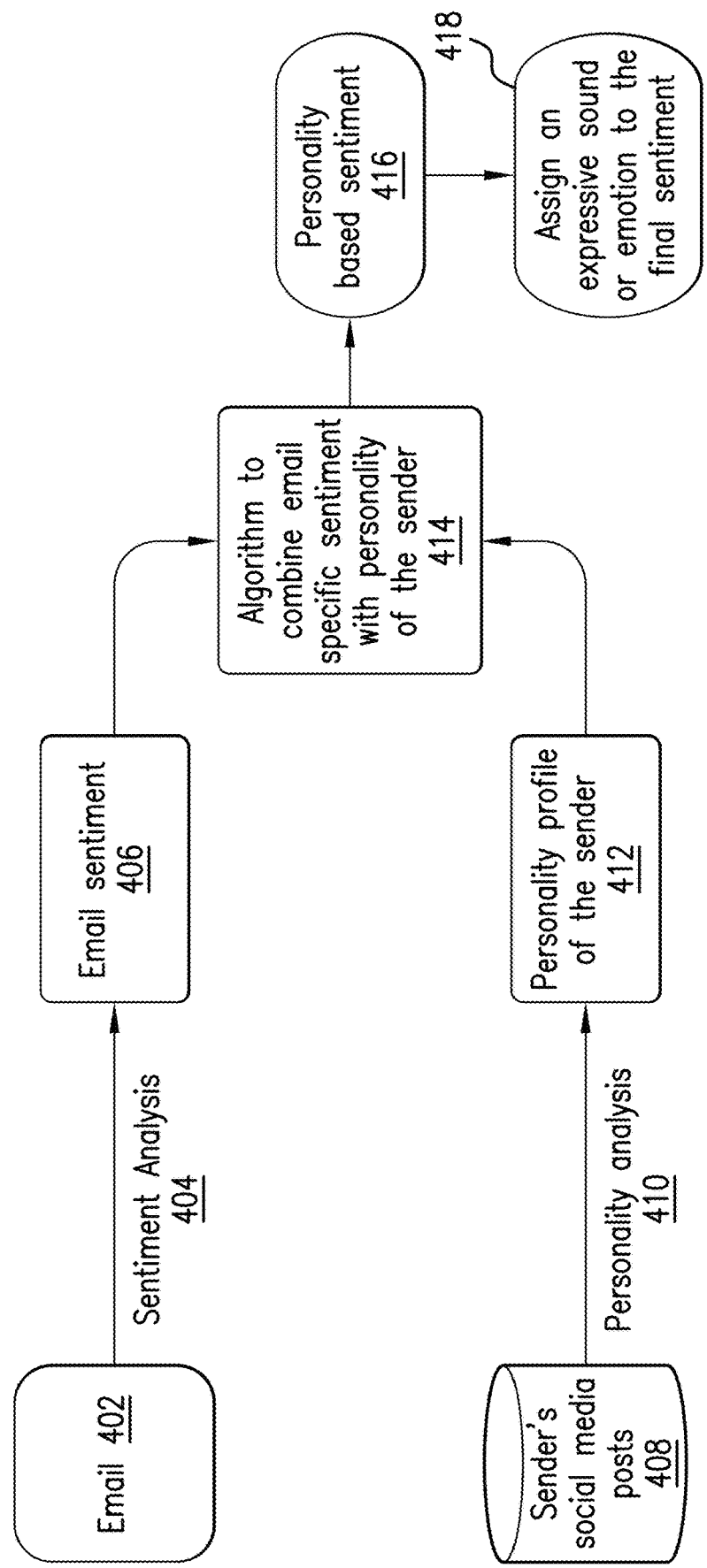
FIG. 4 depicts a component interaction model, according to an aspect of the invention.

Referring to FIG. 4, the sentiment 406 of the email is first extracted from the email text 402, in step 404. However, in one or more embodiments, the extracted sentiment is not taken as the exact emotion of the sender, inasmuch as sentiment is only a short-term representation of the sender's emotion and is affected greatly by the sender's long term emotional state (which is the sender's personality). In order to extract the personality of the sender, his or her social media contents 408 are analyzed at 410 to obtain insight(s) 412 about his or her personality. Then, the personality and the immediate sentiment are combined algorithmically at 414 to obtain a personality-based sentiment 416 of the email, which can then be represented using a sound and/or an emoticon, as seen at 418.

Figure 5:
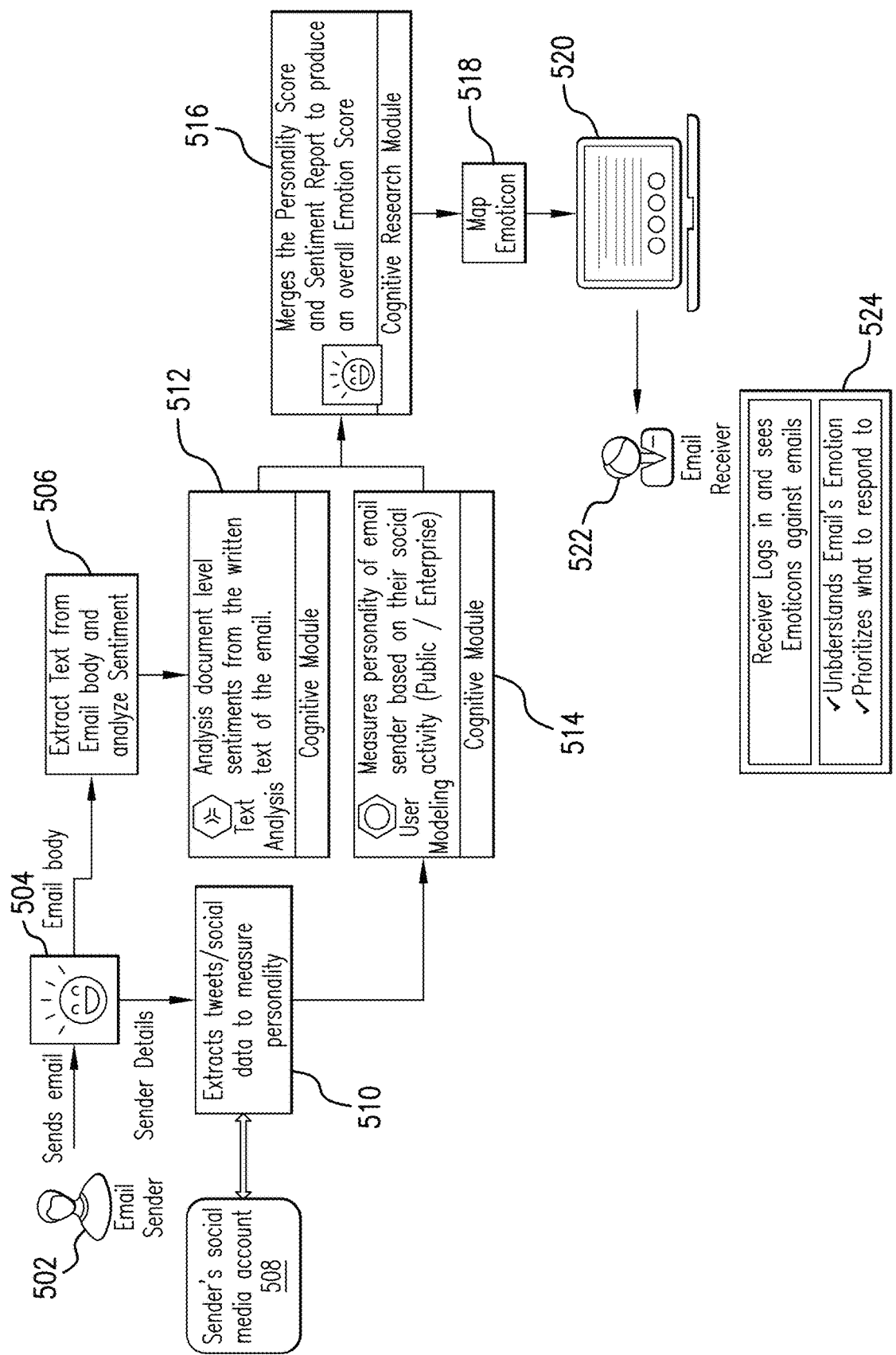
FIG. 5 depicts an exemplary implementation and algorithm, according to an aspect of the invention.

Reference should now be had to FIG. 5, for a non-limiting exemplary detailed flow chart and block diagram, including (i) Sentiment Analysis of the Email Body, (ii) Producing Personality Profile of the Sender, (iii) Personality Based Sentiment Analysis Algorithm, and (iv) Mapping PBSS to Emoticons & Compute Sentiment tone.

Sentiment Analysis of the Email Body:

Email sender 502 sends an email having a body 504. Text is extracted from the email in step 506 and the sentiment is analyzed. In one or more embodiments, sentiment analysis of the email body (test) is carried out using a known technique such as provided by the IBM Alchemy Sentiment Analysis Service which uses a Natural Language Processing based technique and provides an easy-to-use mechanism to identify positive and/or negative sentiment within textual information, as seen at 512. The output of step 512 is a Positive or Negative sentiment score. Step 512 can be carried out with a cognitive module.

Producing Personality Profile of the Sender:

One or more embodiments produce a personality profile of the sender 502. Sender details are extracted from the email body 504 and sender information is gathered based on the sender's email address, name and contact, which permits determining the sender's social media data. For example, in step 510, extract tweets or other social data from a sender social media account 508, to measure personality (generate a personality profile), as seen at 514. This can be carried out using known techniques and may be implemented via the aforementioned cognitive module; for example, the IBM Watson™ Personality Insight Service can be used to carry out this step. The IBM Watson™ Personality Insights service provides an application programming interface (API) that enables applications to derive insights from social media, enterprise data, or other digital communications. The service uses linguistic analytics to infer personality and social characteristics, including the Big Five personality traits, and shows Needs, and Values, from text. The output of the IBM Watson™ Personality Insight Service includes the three types of personality models: Big5 (Big Five), Basic Needs and Values, each of which has various facets. Of course; privacy should always be respected; for example, one or more embodiments employ an opt-in process.

Personality modeling originated from the field of psychology. Multiple studies have focused on the influence of personality factors on an individuals' behavior and decisions. In particular, several researchers found that variations in word usage in writings such as blogs, essays, and tweets can predict aspects of personality.

In one or more embodiments, among all the traits that are extracted and analyzed by the IBM Watson™ Personality Insight Service, nineteen facets were selected that are related to communications with other people, as shown in the table of FIG. 6. All the facets have a positive score except Anger, Anxiety, Self-consciousness, Immoderation, and Vulnerability, which have a negative score. One or more embodiments employ these facets in a technique to provide sentiment analysis with personality profile.

Some embodiments employ a more sophisticated approach than in FIG. 6. Refer to FIGS. 10 and 11A-11C. In one or more embodiments, the output of Personality Insights includes three types of personality traits with their measures, with each having various facets. The table of FIG. 10 shows those facets that are used in one or more embodiments. The facets are considered positive, except anger, anxiety, self-consciousness, immoderation, and vulnerability, which are considered to be negative. FIGS. 11A-11C set forth attributes of high and low scores for various facets.

Personality Based Sentiment Analysis Algorithm:

This algorithm combines the personality of the sender derived from profile (social and or company internal) and the sentiment analysis of the email to formulate a ranking for that email. One or more embodiments employ an algorithm to combine the sentiment analysis from 512 with the personality profile from 514 to obtain the Personality Based Sentiment score (PBSS) of the email, as seen at 516. In general, the relationship can be depicted as:

$$PBSS=f(Sentiment, Personality)$$

The function f(.) can have any form (linear, non-linear, machine learning and/or statistical modeling based). In one or more embodiments, the final score is obtained as a weighted average of the positive attitude of the personality profile of the email sender and the sentiment analysis of the email content. The relationship and six types of categories for the final score are given below:

$$\text{Final Emotional Score} = 0.3 * \text{Positive Attitude} + 0.7 * \text{Sentiment Analysis}$$

If (Final Score<0.2)
   Category 6 (Very tense)
Else if (0.2<=Final Score<0.3)
   Category 5 (More tense)
Else if (0.3<=Final Score<0.5)
   Category 4 (A Little Tense)
Else if (0.5<=Final Score<0.6)
   Category 3 (Neutral)
Else if (0.6<=Final Score<0.8)
   Category 2 (Happy)
Else
   Category 1 (Very Happy)

It will thus be appreciated that one or more embodiments provide an algorithm to measure the final emotional score by weighing the positive attitude of the personality profile of the email sender and the sentiment analysis of the email content. The above example is non-limiting and other weights and/or combinations of sentiment and personality can be used in other embodiments.

Mapping PBSS to Emoticons & Compute Sentiment Tone:

As seen at 518, one or more embodiments map the PBS Score (PBSS) to emoticons that represent the level of sentiment and then compute an overall tone. One or more embodiments use the six emoticons shown in FIG. 7 to represent the final six PBS scores from the previous step. The emoticons appear on the screen 520 of the receiver 522; as seen at 524, the receiver logs in and can prioritize what e-mails to respond to, based on the emoticons.

The sentiment forecast of the day is obtained by performing various voice representations of the overall sentiment of each email. The system provides a button for the user to listen to the overall sentiment or the "tone of the day."

During experimental testing of an exemplary web email inbox implementation, significant differences were noted between personality-biased sentiment and raw email sentiments. After taking the personality of the sender into account, the sentiment output of the exemplary system better represented the magnitude of the emotion expressed in the email. Thus, one or more embodiments provide one, some, or all of the following benefits, as compared to prior art systems:

Sentiment ranking as part of the email preview, in the form of an emoticon;

Filtering/Sorting of emails based on Sentiment (PBSA);

Playing an emotion sound.

Figure 8:
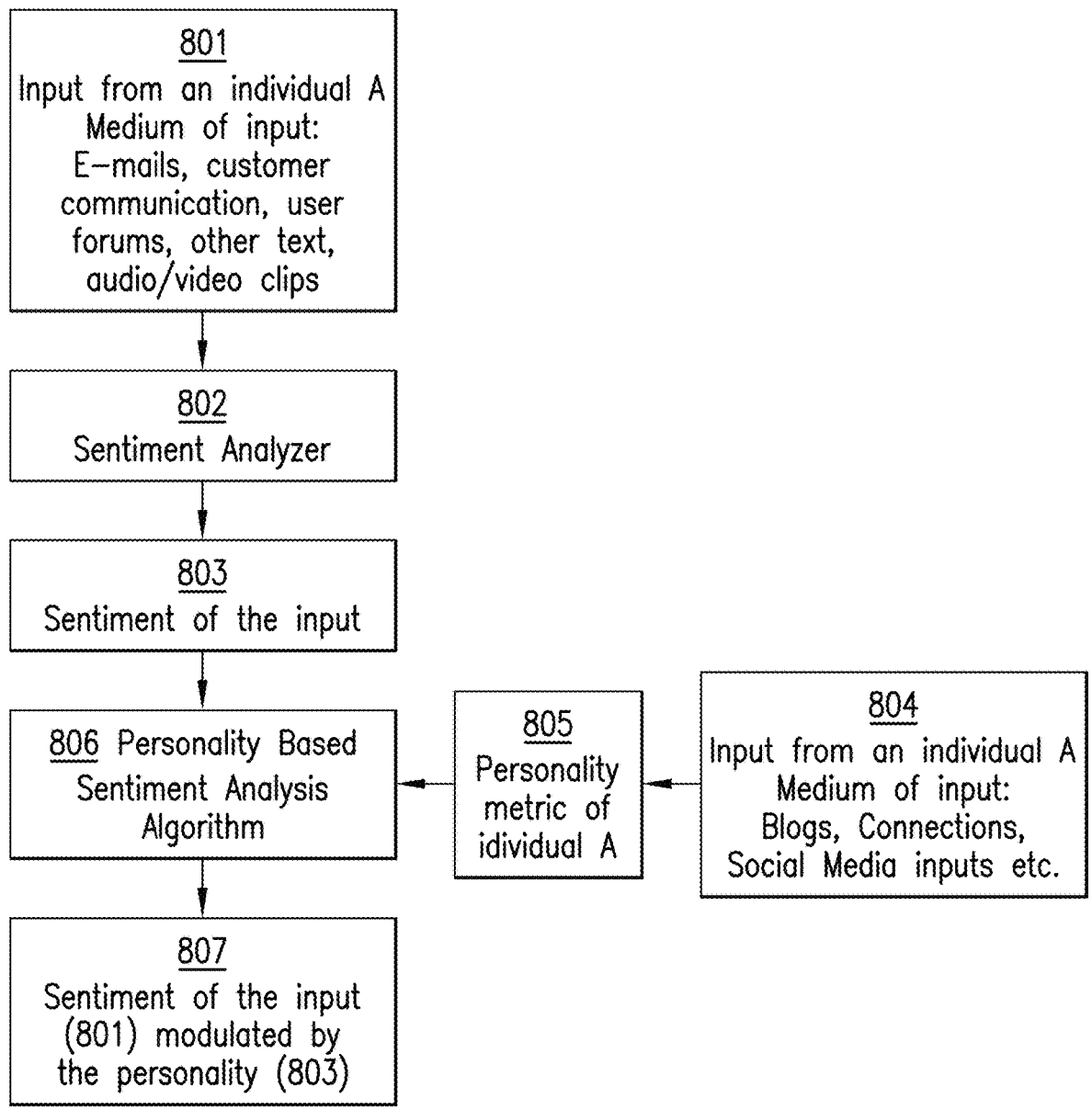
FIGS. 8 and 9 present combined flow charts and block diagrams, according to an aspect of the invention.

Various embodiments can be extended to different media types including text, audio, video or any combination of these, as seen at 801 in FIG. 8. One or more embodiments take two inputs—personality of an individual A, $P_A$ 805, and a sentiment of a media (text, audio, video etc.) from the same individual, $S_A$ 803. The system then produces another "sentiment" score (of the same media)—$SP_A$ 807—that is modulated by the individual's personality. The system 806 can be given by:

$$SP_A = f(P_A, S_A)$$

where f( ) denotes a functional relationship among its arguments. In general, the exact form of f( ) can be learned from existing data through the use of Neural Network, support vector machines (SVM), or any such machine learning algorithms.

In a typical set-up, for a given individual, a system can measure the personality metric (see above discussion of IBM Watson™ Personality Insight Service) and a sentiment analyzer 802 (see above discussion of IBM Alchemy Sentiment Analysis Service) can provide the sentiment of the input media 801. An "expert human" can provide a learning system (Neural Network etc.) with an insight into how much the sentiment score deviates from the individual's personality. With this set of input(s), the system can learn a rule to assign a score to the sentiment of a media (produced by the individual) when the personality of the individual is also considered as a factor.

The input 801 and 804 to the system 806 can be stratified into required segments such as "work/professional," "social," etc. As a result, the machinery 806 will be trained to extract sentiment (modulated by personality) of an individual in a specific context. Therefore, there can be several context-specific "systems" 806 that can be designed for every individual. Other non-limiting exemplary uses of this system include creating sub modules that learn about cultural differences, and then over international communications, taking some of these sub values to create the ranking of emotion for an email—also assisting a sender to write an email for a particular person from X culture, and previewing the sentiment in which the receiver will perceive the email.

The Personality Based Sentiment Analysis Algorithm 806 can be modified to take into account the culture of the user. A simple cultural background setting in both the Personality Based Sentiment Analysis Algorithm 806 and the sentiment analyzer 802 can be used to store and modify the sentiment and personality weighting according to the person's cultural background, to enhance the ability to be sensitive to individuals of diverse cultural backgrounds.

The system 806 can learn different "rules" applied to different cultures when the inputs 801, 804 are further stratified to include "culture" ("work," "social," "personal attributes," etc.). In some embodiments, some personal attributes are not measured, but are used as an element towards the grant culture sentiment score. In this respect, for example, during the learning process a large negative score can be assigned (by expert) for the machine to identify "negative terms" as perceived by that culture.

One or more embodiments adjust to the culture of the receiver, in real time, to indicate how the email and/or post would be perceived by the receiver, and through this mechanism, present an opportunity for the sender to optimize content in the following manner:

a) User can see, in a color-coded mode, which words are influencing the tone of the content, and present alternative words to soften or strengthen the intended statement.

b) As input and edits happen, the sender can see the overall sentiment update in real time.

Figure 9:
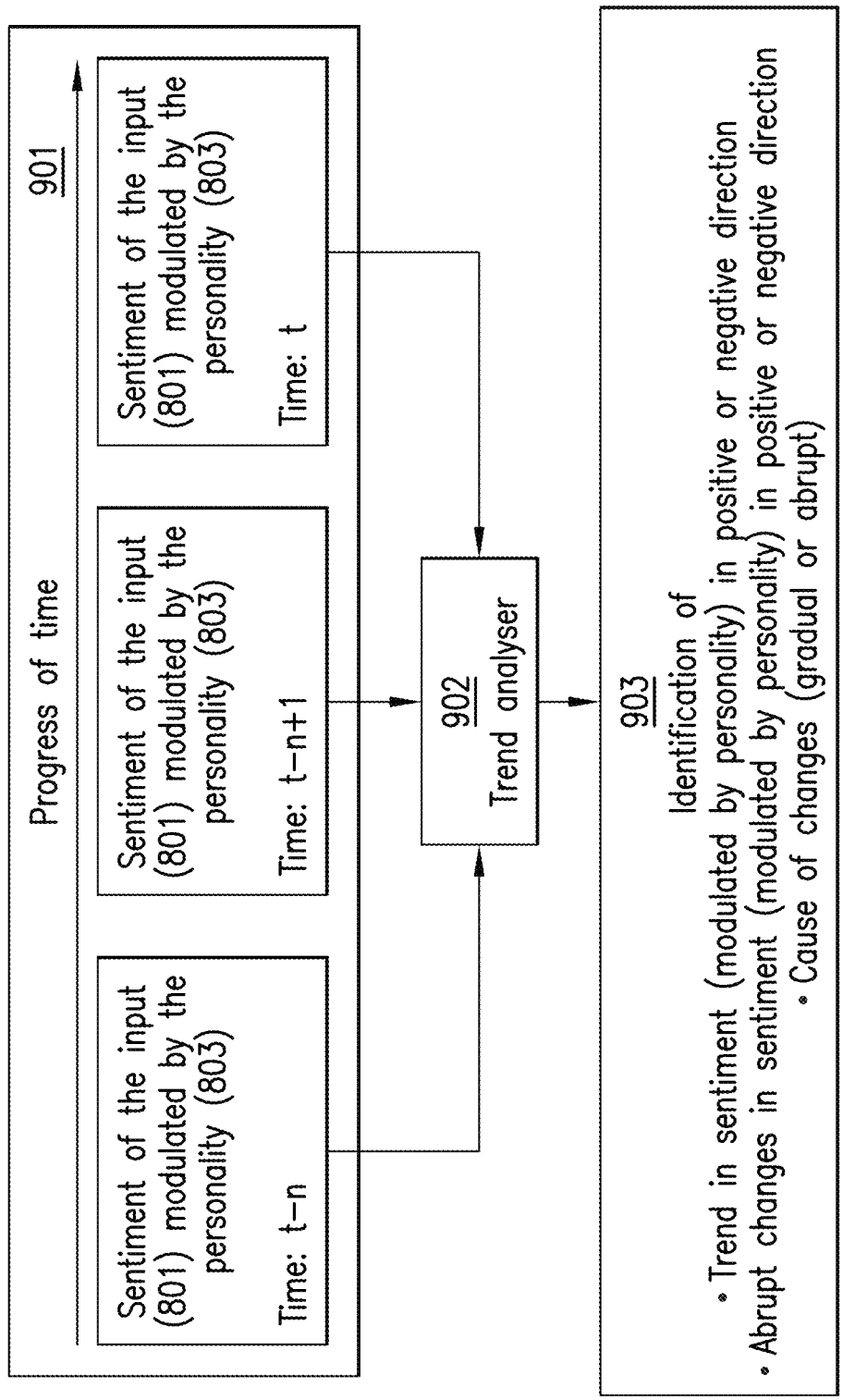

Referring to FIG. 9, once the score $SP_A$ from an individual is available for multiple time points 901, a trend analyzer 902 can track those changes and provide insights 903 such as:

a) Trend in the score in positive or negative direction (or lack thereof)

b) Abrupt changes in the score in positive or negative direction c) Potential cause of changes Other opportunities for this model in the automatic response space or AI space include the ability for a system to adjust its responses based on the customer's $SP_A$ 807.

As noted, one or more embodiments can be extended for use in all natural language (NL) streams: e.g. e-mails, customer communications, social media, text, audio, film clips, and the like. One or more embodiments obtain a Personality Based Sentiment (PBS) score, which can be applied to a variety of other Natural Language streams. Some additional non-limiting exemplary use-cases are outlined below.

Online Reviews:

For many consumers, the first place to find out more about a certain product and/or service they are about to buy is to go through on-line reviews, which are usually written by other previous consumers or by subject matter experts in the field. Some websites offer review data for almost every product that is listed on their marketplace; there are also review-only communities. In any case, the consumers are often forced to wade through many reviews in order to make an informed choice. Again, reviews can be biased based in the personality of the writer and will not always reflect the true assessment of the product and/or service. One or more embodiments can be applied in this scenario to generate a PBS score which will take into account the personality of the reviewer based on the reviewer's other activities on the web (social media, other review history, etc.) and the sentiments extracted from the written text. The PBS score can then be used in conjunction with existing review rating(s), such as '5 star ratings,' to make an informed choice.

Online Chat & Messaging:

Online chat and messaging systems offer real-time transmission of text messages in natural language from the sender to the receiver. Chat messages offer a feeling similar to spoken language and thereby have a high degree of natural language characteristics. Chat messages can be quite ambiguous at times where the receiver is not entirely sure of the sender's true sentiment and the emotion. One or more embodiments can be used to continuously monitor and analyze the chat history while the chat is in progress and to present a PBS score (in the form of an emoticon or a general mood level indicator) to the receiver. As the 'tone' or Sentiment of the messages change during the conversation, the PBS indicator can dynamically respond to the sentiment of the moment.

Customer Support:

One or more embodiments can be used in the customer support use-case; for example, in two ways:

Customer Support—Customer Communications:

True sentiment and satisfaction level can be extracted from customer communication using one or more embodiments. This could be in the form of customer complaints, feedback or one or more logged support tickets. A PBS score can be obtained using the customer's personality (based on social media and/or historical data) and the sentiments extracted from the written communication. The customer support staff can further prioritize complaints and/or tickets based on the sentiment level and therefore choose to respond to unhappy and disgruntled customers first.

Customer Support—Automated Responses:

Recently, the demand for cost-effective solutions to the customer service problem has increased significantly. By delivering solutions automatically to the customers, an enterprise can essentially reduce its operating and training costs. Even in the least automated scenario, where customers are sent automated responses usually as an acknowledgment of receipt, one or more embodiments can be used to tailor the response, from perhaps a list of ten responses, based on the PBSA score. This will be particularly effective in connection with a very negative complaint that is being lodged. Instead of the customer receiving a standard message such as "Thanks for your feedback, we will get back to you shortly" a more tailored message can be provided, such as "We completely understand your frustration, we are getting this handled right now for you." In another aspect, in a positive feedback scenario, a message such as "Thanks for your kind positive feedback—we are happy to know you are completely satisfied with our service" can be provided.

This use-case can be applied to more sophisticated automated responses where a full repository of curated responses can be used based on a detailed PBSA score.

Social Media:

One or more embodiments can be used to perform another level of sentiment analysis and opinion mining on social media data. Understanding the personality of the user and extracting sentiments from the data provides a whole new dimension for marketing and branding companies. For example, a person on a social media platform who always posts negative comments and/or updates will have a negative personality score, and when overlaid with a very negative sentiment, may result in a more neutral overall PBSA score.

Sound and/or Audio Analysis:

One or more embodiments conflate personality and sentiment; this is not restricted to text or linguistic analysis but can be further applied to an acoustic approach as well. A personality profile can be built based on the prior recorded conversations of a speaker and can be conflated with the sentiment extracted from a certain live conversation to produce a PBSA score. For example, Jane Smith's acoustic profile can be built based on old recordings and historical speeches and can be used to analyze sentiments from a live speech.

It is worth noting that the Customer Support and the Online Chat scenarios outlined above demonstrate how one or more embodiments respond to changes in reactions and/or responses of the user. In the Customer Support scenario, depending on the PBS score, a tailored (automated) response can be provide or a certain level of escalation can be automatically set and/or triggered within the support system.

In an online chat scenario, based on the PBS level, the support staff can tailor the response.

Given the discussion thus far, it will be appreciated that an exemplary method, according to an aspect of the invention, includes the step of obtaining, at a sentiment analyzer 802, natural language media input 801. As used herein, a sentiment analyzer includes a sentiment analyzer such as the Alchemy Sentiment Analysis API available from International Business Machines Corporation, Armonk, N.Y., USA, or other APIs listed herein. A further step includes determining, with the sentiment analyzer, sentiment of the natural language media input. A still further step includes obtaining, at a personality analyzer, data 804 indicative of a personality of an originator of the natural language media input. On exemplary personality analyzer includes the IBM Watson Developer Cloud Personality Insights tool available from International Business Machines Corporation, Armonk, N.Y., USA; other APIs are listed herein. An even further step includes determining, with the personality analyzer, a personality metric of the originator of the natural language media input.

Non-limiting examples of natural language media input include e-mail, customer feedback, a user forum entry, audiovisual input, and the like.

The method further includes combining the sentiment of the natural language media input and the personality metric of the originator of the natural language media input, to obtain a personality-based sentiment 807 of the natural language media input. As noted elsewhere, this can be carried out, for example, by calculating a weighted average of the sentiment of the natural language media input and a positive attitude of the personality metric of the originator of the natural language media input (e.g. using code to implement the formula set forth herein); by applying machine learning; and/or by applying statistical modeling.

Non-limiting examples of Machine Learning techniques include Logistic Model Tree, Decision Tree, and Linear classifiers. Non-limiting examples of Statistical Models include SPSS and R.

The method even further includes providing the natural language media input to a receiver 522 together with a representation of the personality-based sentiment of the natural language media input, as seen at 520, 524 (the representation could be, for example, a very tense emoticon, a more tense emoticon, a tense emoticon, a neutral emoticon, a happy emoticon, or a very happy emoticon, assigned in accordance with the table of FIG. 7 and ranges set forth herein).

In some instances, the steps are repeated for a plurality of additional natural language media inputs of a plurality of additional originators, and responses to the natural language media input and the plurality of additional natural language media inputs are prioritized based on the representation of the personality-based sentiment of the natural language media input and the plurality of additional natural language media inputs, as explained at 524.

In some instances, the steps are repeated for a plurality of additional times, as shown in FIG. 9 and accompanying text. Outputting the emoticons can, but need not, be repeated. A trend in the personality-based sentiment and/or an abrupt change in the personality-based sentiment are identified using trend analyzer 902. Trend analyzer 902 can, for example, be similar to time series analysis; specific examples include aggregated—form a model to show the slopes of the trend—positive/happy, and negative/sad.

Optionally, the cause of the trend and/or abrupt change is identified using trend analyzer 902. In some instances, the model adjusts upon detecting 'abrupt' anomalous changes to make the sentiment ranking more accurate.

In some instances, an identifier of the originator of the natural language media input is extracted from the natural language media input (e.g., as discussed above, sender details are extracted from the email body 504)(for example, using the aforementioned Watson APIs). The data indicative of the personality of the originator of the natural language media input is then located based on the identifier (e.g., as discussed above, sender information is gathered based on the sender's email address, name and contact, which permits determining the sender's social media data) (for example, using the aforementioned Watson APIs). The skilled artisan will appreciate that one non-limiting example of data indicative of the personality of the originator of the natural language media input is a social media post of the originator.

Even further, given the discussion thus far, it will be appreciated that an exemplary non-transitory computer readable medium, according to further aspect of the invention, includes computer executable instructions which when executed by a computer cause the computer to perform any one, some, or all of the method steps described herein. These instructions, when loaded into a memory, configure one or more processors to create at least a portion of an apparatus as disclosed herein; e.g., form the sentiment analyzer and personality analyzer.

One or more embodiments of the invention, or elements thereof, can be implemented in the form of an apparatus including a memory and at least one processor that is coupled to the memory and operative to perform exemplary method steps.

One or more embodiments can make use of software running on a general purpose computer or workstation. With reference to FIG. 1, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 1) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-3 and accompanying text. For example, some embodiments could be made available as a service in a cloud, and/or could use a cloud-based service such as Personality Insights from the IBM Watson Developer Cloud.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks shown in FIGS. 4, 5, 8, and 9.

The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing to a receiver an ordered listing of a plurality of natural language media inputs together with representations of personality-based sentiments of said natural language media inputs, said method comprising:
   obtaining, at a sentiment analyzer implemented by a processor of a computer, said natural language media inputs;
   determining, by said sentiment analyzer using natural language processing on content of each of said natural language media inputs, a sentiment for each of said natural language media inputs;
   extracting, from each of said natural language media inputs, an identifier of an originator of said natural language media input;
   extracting, from a social media feed, on the basis of said identifier, data distinct from said content of said natural language media input and indicative of a personality of said originator of said natural language media input;
   determining, by a personality analyzer using linguistic analytics on said data indicative of said personality and distinct from said content of said natural language media input, a personality metric of said originator of each of said natural language media inputs;
   obtaining a personality-based sentiment for each of said natural language media inputs by said processor combining said sentiment of said natural language media input and said personality metric of said originator of said natural language media input;
   ordering said natural language media inputs into a listing that is prioritized in order of scores calculated for said personality-based sentiments of said natural language media inputs;
   determining, based on said scores, a representation for each of said personality-based sentiments of said natural language media inputs in said listing, wherein said representations are respective emoticons; and
   providing said listing of said natural language media inputs to said receiver, by said processor via a display of said computer, together with said respective emoticons of said representations of said personality-based sentiments of said natural language media inputs in said listing.

2. The method of claim 1, wherein, in said step of obtaining said natural language media input, said natural language media input comprises an e-mail.

3. The method of claim 1, wherein, in said step of obtaining said natural language media input, said natural language media input comprises a user forum entry.

4. The method of claim 1, wherein, in said step of obtaining said natural language media input, said natural language media input comprises audiovisual input.

5. The method of claim 1, further comprising:
   repeating said steps of obtaining said natural language media input, determining said sentiment of said natural language media input, retrieving said data indicative of said personality of said originator of said natural language media input, determining said personality metric of said originator of said natural language media input, combining said sentiment of said natural language media input and said personality metric of said originator of said natural language media input to obtain said personality-based sentiment of said natural language media input, and providing said natural language media input to said receiver together with said representation of said personality-based sentiment of said natural language media input, for a plurality of additional natural language media inputs of a plurality of additional originators; and
   prioritizing responses to said natural language media input and said plurality of additional natural language media inputs on the basis of said representation of said personality-based sentiment of said natural language media input and said plurality of additional natural language media inputs.

6. The method of claim 1, wherein each of said respective emoticons is one of a very tense emoticon, a more tense emoticon, a tense emoticon, a neutral emoticon, a happy emoticon, and a very happy emoticon.

7. The method of claim 1, wherein said combining of said sentiment of said natural language media input and said personality metric of said originator of said natural language media input, to obtain said personality-based sentiment of said natural language media input, comprises calculating a weighted average of said sentiment of said natural language media input and a positive attitude component of said personality metric of said originator of said natural language media input.

8. The method of claim 1, wherein said combining of said sentiment of said natural language media input and said personality metric of said originator of said natural language media input, to obtain said personality-based sentiment of said natural language media input, comprises applying machine learning.

9. The method of claim 1, wherein said combining of said sentiment of said natural language media input and said personality metric of said originator of said natural language media input, to obtain said personality-based sentiment of said natural language media input, comprises assigning a score to said sentiment of said natural language media modulated by a positive attitude component of said personality metric of said originator of said natural language media input.

10. The method of claim 1, further comprising:
    repeating said steps of obtaining said natural language media input, determining said sentiment of said natural language media input, obtaining said data indicative of said personality of said originator of said natural language media input, determining said personality metric of said originator of said natural language media input, and combining said sentiment of said natural language media input and said personality metric of said originator of said natural language media input to obtain said personality-based sentiment of said natural language media input, for a plurality of additional times; and
    identifying at least one of a trend in said personality-based sentiment and an abrupt change in said personality-based sentiment.

11. The method of claim 10, further comprising identifying a cause of at least one of said trend in said personality-based sentiment and said abrupt change in said personality-based sentiment by natural language analysis of more than one of said natural language media inputs that are associated with said originator.

12. The method of claim 1, wherein different ones of said natural language media inputs are provided by a plurality of originators, including said originator, and wherein
    said ordering of said natural language media inputs into said listing is prioritized in order of said scores calculated for said personality-based sentiments of said natural language media inputs across all of said originators.

13. The method of claim 1, further comprising:

an email analyzer identifying said originator by their e-mail ID; and said personality analyzer carrying out personality analysis based on activity on one or more collaborating platforms that corresponds to said e-mail ID.

14. The method of claim 1, wherein said representations further include a sound that complements one of the emoticons and the method further comprises playing said sound when providing said listing of said natural language media inputs to said receiver.

15. The method of claim 14, wherein said representations further include a sentiment sound forecast and the method further comprises playing said sentiment sound forecast prior to providing said listing of said natural language media inputs to said receiver.

\* \* \* \* \*